Feb. 21, 1933. G. KRÖHNE 1,898,732
MILLING CUTTER
Filed April 23, 1930

G. Kröhne
INVENTOR
By: Marks & Clerk
ATTYS.

Patented Feb. 21, 1933

1,898,732

UNITED STATES PATENT OFFICE

GUSTAV KRÖHNE, OF ROSENBERG-OBERPFALZ, GERMANY

MILLING CUTTER

Application filed April 23, 1930, Serial No. 446,703, and in Czechoslovakia July 20, 1929.

My invention relates to milling cutters and more particularly to cutters for dove-tailed grooves.

It is an object of my invention to eliminate certain difficulties connected with the milling of such grooves as will be explained below.

To this end, I provide a built-up cutter with a plurality of cutter units each of which is adapted to mill a part of the groove.

In quantity production of parts having a dove-tailed groove, or grooves, for instance, tie plates, of wrought iron or steel, it has already been proposed to machine the parts with several milling cutters in succession, on several machines. This method has the serious drawback of requiring as many machines as milling cutters are required for making the finished groove. Another drawback is the necessity of carrying the parts to, and of chucking them in, the several machines, involving inaccuracy and loss of time.

It has already been proposed to provide machines in which all the milling operations were performed from roughing to finishing. However, in this case milling cutters of various types, such as disc and shaft cutters, are provided in the same machine, each with its own feeding and cutting speeds, and with their spindles at right angles to each other, and the machines become heavy, expensive and demand much power. They also have a tendency to get out of order on account of their complicated construction. Generally, the initial and maintenance cost is high, and therefore such machines are uneconomic.

It has also been proposed to operate with a single milling cutter which is fashioned to the section of the groove required, but such cutters are not satisfactory. Assume that a dove-tailed groove comprises a parallel and an inclined portion. A milling cutter for this groove comprises a parallel and a tapering portion. At the point where the two portions join the flow of chips and the access of coolant are obstructed, the more so as the roots of the teeth at this point are too flat and the teeth are not backed off enough. This causes rapid heating and failure of the cutters at this point.

The existing cutters have straight teeth and the consequence is that their action on the metal is not "peeling" but "hacking" and the chips are so-called needles which tend to clog the teeth or to stick to the cutting edges, particularly if the edges are somewhat worn. The chips also cause rapid heating and clogging and prevent clean cutting of the work.

Needle chips also involve danger to the operator as they often cause malignant hurts.

The described method, therefore, can only be applied for small and generally trapezoidal-section grooves in cast iron and other short-chipping metals, with the feeding and cutting speeds determined with consideration of the weakness of the cutters. It is not suitable for up-to-date machining of wrought iron and steel.

In the accompanying drawing, a milling cutter embodying my invention is illustrated diagrammatically by way of example.

In the drawing

Figure 2:
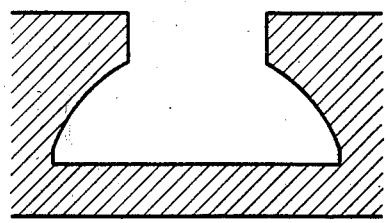
Fig. 2 is a section of the finished groove.
Figures 3, 4, 5:
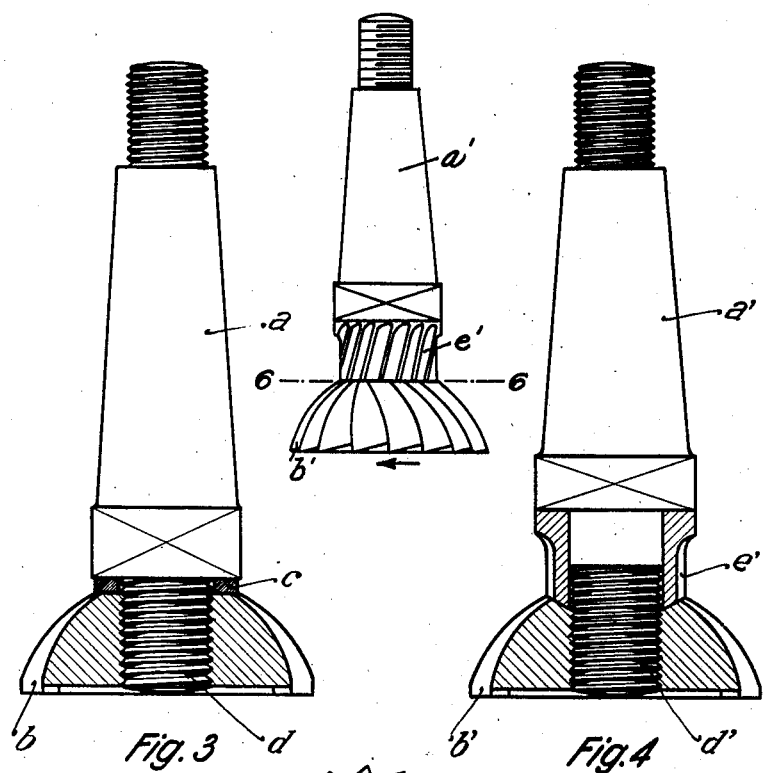
Fig. 3 shows, by way of comparison, a conventional form of finish cutter for the old method.
Fig. 4 is a side elevation, partly in section, of the improved cutter.
Fig. 5 is a side elevation of the improved cutter.
Figure 6:
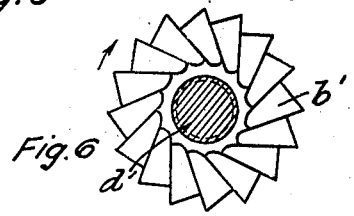
Fig. 6 is a sectional view on line 6—6 of Fig. 5.

Referring now to the drawing, and first to Fig. 4, this illustrates a built-up milling cutter having two units for milling the groove Fig. 2, but it is understood that I am not limited to a definite number of units. $a'$ is a shank, preferably of mild, ductile steel, with a square shoulder and a threaded extension $d'$ at its lower end, $e'$ is a parallel cutter below the shoulder for milling the upper parallel portion of the groove, and $b'$ is a tapered or mushroom-shaped cutter for milling the lower portion of the groove which is screwed onto the threaded extension $d'$ and holds the parallel cutter $e'$ in the manner of a lock nut. In this manner, any number of various cutters may be secured on a single shank, the cutters being securely held and supporting each other.

The several cutters or units on the shank $a'$ are made of alloy steel the analysis of which is suited for the work each unit performs, and may be provided with chip-breaking grooves.

The teeth of the several units are preferably of the herring-bone type, that is, they are arranged at an angle to each other the apex of which points in the direction of rotation. Such teeth bring about a steady rotation of the cutters so that the cutters themselves and the machines are conserved, as distinguished from the hacking operation of the straight teeth referred to. The novel cutters have peeling action and the chips are of the normal constitution and not needles. The inclined and preferably oppositely arranged teeth of the several units act like the blades of a fan and assist the flow of the chips and the coolant.

The built-up milling cutter according to my invention is a very efficient tool which permits high cutting and feeding speeds and with such cutters on simple and cheap machines quantity production work of any kind can be done. Roughing and the expensive tools and loss of time it involves, are eliminated and the number of spindles in machines equipped with my novel cutters is only half that of the old machines. All spindles are parallel. The machines are small, reliable, efficient, simple and of easy operation.

The extension for the cutter, as shown in Fig. 3 includes a shank $a$, threaded extension $d$ upon which is engaged the tubular cutter $b$, there being a ring $c$ interposed between the shank and cutter, as customary. The initial, maintenance and operating costs of the machines are only a fraction of those of existing machines.

Figure 1:
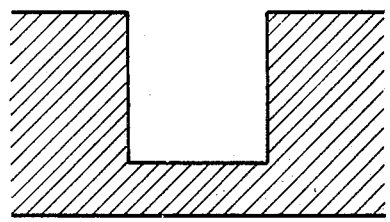
Fig. 1 is a section of the first stage of machining a dove-tailed groove.

Fig. 1 shows the groove after the first stage which was performed separately in the old machines, and Fig. 3 shows a cutter for the old method, with a shank $a$, a threaded extension $d$, a square shoulder, a hardened washer $c$, and a tapered or mushroom cutter $b$ on the threaded extension.

I claim:

A milling cutter for dovetailed grooves, comprising a shank, a tapered cutter unit mounted on said shank for machining the trapezoidal portion of the groove, a cylindrical cutter unit for machining the rectangular portion of said groove, said cutter units being equipped with inclined teeth forming an angle, the apex of which points in the direction of rotation of the cutter.

In testimony whereof I have signed my name to this specification.

GUSTAV KRÖHNE.